United States Patent Office 3,235,961
Patented Feb. 22, 1966

3,235,961
METHOD OF PRODUCING COATED ALUMINIUM BASE ALLOYS
Frederick Alfred Champion, Beaconsfield, Derek Walter Jones, Camberley, and Ernest William Skerrey, Uxbridge, England, assignors to The British Aluminium Company Limited, London, England, a company of Great Britain
No Drawing. Filed June 7, 1962, Ser. No. 200,623
Claims priority, application Great Britain, June 12, 1961, 21,184/61
1 Claim. (Cl. 29—527)

This invention relates to improvements in coated aluminium-base alloys and method of producing same. The term "aluminium-base alloy" is used herein to denote an alloy containing more than 50% by weight of aluminium.

In many applications it is desired to provide an aluminium-base alloy usually selected for its mechanical properties, with a decorative or protective coating, e.g. of a lacquer or a vitreous enamel, or with a coating of an adhesive for the attachment of a solid, e.g. a plastic film. Examples of such applications are the manufacture of crown corks, canisters, cosmetic packs and food packs. Good adhesion between the coating and the metal is normally required to resist mechanical damage and/or to ensure adequate protection of the underlying metal from corrosion and, in such cases, it is necessary to remove from the surface to be coated any substance which prevents continuous contact between the metal and the coating and reduces adhesion therebetween. Such substances are hereinafter referred to as "contaminants."

Oils and greases on the surface to be coated may be removed by exposing that surface to the vapour of a suitable solvent but any solid contaminant present is likely to remain on the surface and interfere to some extent with the adhesion of the coating to be applied. It is sometimes possible to remove such solid contaminant by physical action during degreasing to give cleaning rather than simple degreasing, but some contaminants cannot be removed in this way. For example, aluminium-magnesium alloys, as normally produced, tend to have a film of magnesia overlying alumina and the magnesia is often in a form affording relatively poor adhesion to a coating applied to a surface having such a film. Chemical etching may be employed to remove the more adherent contaminants but has the disadvantage that it requires etching equipment occupying valuable floor space and also increases the time consumed by the process. Additionally, the matt appearance produced by chemical etching may not be desired under a clear lacquer.

We have now found, surprisingly and unexpectedly, that aluminium which is at least 99% pure and which has been cleaned, but not etched, gives adhesion of non-metallic coatings comparable with that which can be obtained on aluminium-base alloys which have been etched.

Accordingly, the present invention provides a coated aluminium-base alloy comprising a core of the alloy, a cladding of at least 99% pure aluminium on one face of the core and a non-metallic coating applied to the cladding.

The invention also extends to a method of producing a coated aluminium-base alloy which comprises applying to at least one face of a core of the alloy a cladding of at least 99% pure aluminium and applying a non-metallic coating to the cladding.

The thickness of the cladding is, with advantage, of the order of 5% of the total metal thickness and may be applied to one or both faces of a sheet of the alloy.

It will be understood that the term "cladding" is used herein to denote a layer of metal applied to a core of metal by one or more rolling operations during which the thicknesses of both the core and the cladding are reduced and the cladding is united with the core. As the core metal usually has to be rolled to the appropriate thickness, the cladding of the core does not generally involve any additional steps or apparatus.

The invention is of particular, but not exclusive, application to aluminium-magnesium and aluminium-manganese alloys.

Some embodiments of the invention will now be described by way of example.

A first sample composed of an aluminium manganese alloy conforming to NS3 (B.S. 1470) containing 1.2% by weight manganese and the remainder being composed of aluminium of about 99.2% purity in the form of an 0.010 inch thick sheet was cleaned by swabbing with a solvent followed by vapour degreasing, lacquered and drawn to the shape of a cup of 1.3 in. internal diameter and 0.8 in. deep.

A second sample similar to the first was etched prior to being lacquered.

A third sample composed of 99% pure aluminium conforming to SIC (B.S. 1470) was cleaned, lacquered and drawn to the shape of a cup of the above dimensions.

All three samples were filled two-thirds full of an aqueous solution of 5% acetic acid and 5% sodium chloride and maintained at 25° C. After three days, corrosion of the first sample extended over 60 to 80% of the lacquered surface whereas both the second and third samples showed no corrosion or other sign of deterioration in lacquer adhesion.

These tests show that cleaned, but unetched, aluminium of at least 99% purity has as good a lacquer adhesion as can be obtained by etching the alloy. Further tests showed that by cladding the alloy with aluminium of at least 99% purity the adhesion of a lacquer on the cladding was at least as good as that which could be obtained by etching the alloy.

This result is surprising and unexpected in that, while slight differences in the quality of the cleaned as-rolled surface might be expected with different metal compositions, the difference in lacquer adhesion observed is much greater than would be expected. For example, an aluminium-magnesium-manganese alloy containing 2.25% by weight magnesium, 0.4% by weight manganese and the remainder being aluminum of about 99.2% purity, the alloy conforming to NS4 (B.S.1470), was, in the form of an alloy sheet 0.012 in. thick, cleaned, lacquered and subjected to the corrosion test described above. After three days corrosion of the alloy had commenced due to failure of adhesion of the lacquer.

A similar test was made in which the NS4 alloy was clad on each surface with a cladding of 99.7% purity aluminium prior to being lacquered, each cladding having a thickness of about 5% of the total metal thickness. After forty days exposure to the corrosion test there was still no failure of adhesion of the lacquer and no corrosion of the metal.

It is known that the corrosion resistance of the substrate plays a part in the corrosion resistance of painted or lacquered metal. This does not, however, appear to be a major factor in the present case as the corrosion resistance of 99.7% purity aluminium is very little better than that of the NS4 alloy, especially under saline conditions, and the test described shows a marked and disproportionate increase in lacquer adhesion and resistance to corrosion by the clad alloy relative to the un-clad alloy.

It will be appreciated that the thickness of the cladding may be as low as is consistent with ensuring continuity thereof and lack of pitting, so that the mechanical properties of the core may be retained.

The superiority of aluminium base alloys coated in accordance with the present invention is further demonstrated by a series of tests the results of which are set out below. In these tests, coated clad aluminium-base alloys, coated with at least 90% pure aluminium and coated aluminium-base alloys without the cladding were exposed to the corrosive effects of a solution of 5% acetic acid/5% sodium chloride at 25° C. and the results are shown as percentage failure of the coatings after 5 days and 40 days respectively. The coating was an epoxy lacquer but vinyl and other lacquers are suitable.

*Test I*

Test samples of 30 S.W.G. strip were lacquered, the lacquer being cured at 250° C. for 45 seconds and exposed to the corrosive solution with the following results:

|  | After 5 days | After 40 days |
| --- | --- | --- |
| NS4 alloy | 100 | 100 |
| NS4 alloy clad with 99.0% pure aluminium | 0 | 3 |
| NS4 alloy clad with 99.7% pure aluminium | 0 | 3 |
| 99.0% pure aluminium | 0 | 1 |
| 99.5% pure aluminium | 0 | 1 |
| 99.8% pure aluminium | 0 | 1 |
| NS3 alloy | 0 | 30 |

*Test II*

Test samples similar to those of Test I but having the lacquer cured at 250° C. for 60 seconds produced the following improved results:

|  | After 5 days | After 40 days |
| --- | --- | --- |
| NS4 alloy | 20 | 100 |
| NS4 alloy clad with 99.0% pure aluminium | 0 | 1 |
| NS4 alloy clad with 99.7% pure aluminium | 0 | 2 |
| 99.0% pure aluminium | 0 | 0 |
| 99.5% pure aluminium | 0 | 0 |
| 99.8% pure aluminium | 0 | 0 |
| NS3 alloy | 0 | 10 |

*Test III*

Test samples of 20 S.W.G. strip having the lacquer cured at 250° C. for 60 seconds produced the following results:

|  | After 5 days | After 40 days |
| --- | --- | --- |
| NS4 alloy | 100 | 100 |
| NS4 alloy clad with 99.7% pure aluminium | 0 | 3 |
| 99.7% pure aluminium | 0 | 15 |
| HS30 alloy | 100 | 100 |
| HS30 alloy clad with 99.0% pure aluminium | 0 | 10 |

*Test IV*

Tests on samples in the form of cups pressed from 30 S.W.G. lacquered strip, the lacquer being cured at 250° C. for 45 seconds gave the following results:

|  | After 5 days | After 40 days |
| --- | --- | --- |
| NS4 alloy | 5 | 100 |
| NS4 alloy clad with 99.0% pure aluminium | 0 | 5 |
| NS4 alloy clad with 99.7% pure aluminium | 0 | 5 |
| 99.0% pure aluminium | 0 | 5 |
| 99.5% pure aluminium | 0 | 2 |
| 99.8% pure aluminium | 0 | 0 |
| NS3 alloy | 0 | 8 |

*Test V*

Test samples similar to those of Test IV but having the lacquer cured at 300° C. for 60 seconds gave the following results:

|  | After 5 days | After 40 days |
| --- | --- | --- |
| NS4 alloy | 5 | 30 |
| NS4 alloy clad with 99.0% pure aluminium | 0 | 2 |
| NS4 alloy clad with 99.7% pure aluminium | 0 | 1 |
| 99.0% pure aluminium | 0 | 2 |
| 99.5% pure aluminium | 0 | 2 |
| 99.8% pure aluminium | 0 | 0 |
| NS3 alloy | 0 | 6 |

*Test VI*

Tests on cups pressed from 20 S.W.G. lacquered strip, the lacquer being cured at 250° C. for 45 seconds gave the following results:

|  | After 5 days | After 40 days |
| --- | --- | --- |
| NS4 alloy | 100 | 100 |
| NS4 alloy clad with 99.7% pure aluminium | 3 | 12 |
| 99.7% pure aluminium | 5 | 20 |
| HS30 alloy | 100 | 100 |
| HS30 alloy clad with 99.0% pure aluminium | 3 | 45 |

*Test VII*

Tests on samples similar to those of Test VI but having the lacquer cured at 300° C. for 60 seconds gave the following results:

|  | After 5 days | After 40 days |
| --- | --- | --- |
| NS4 alloy | 15 | 100 |
| NS4 alloy clad with 99.7% pure aluminium | 0 | 4 |
| 99.7% pure aluminium | 0 | 4 |
| HS30 alloy | 80 | 100 |
| HS30 alloy clad with 99.0% pure aluminium | 0 | 20 |

The NS3 alloy referred to above is one containing 1.2% by weight manganese and the remainder being commercial purity aluminium.

The NS4 alloy referred to above is one containing 2.25% by weight magnesium, 0.4% by weight manganese and the remainder commercial purity aluminium.

The HS30 alloy referred to above is one containing 0.7% by weight magnesium, 1.0% by weight silicon and 0.5% by weight manganese, the remainder being commercial purity aluminium.

It will also be appreciated that the only restriction on the core material is that it should not be such as to diffuse harmful elements to the surface of the cladding at the actual cladding thickness employed. In particular, deleteriously high copper contents should be avoided.

It is to be understood that the invention is applicable not only to lacquer coatings but also to other coatings where this type of adhesion is involved, e.g. with printing inks, paints, vitreous enamels, metallic and non-metallic coatings in general, and also with adhesives for attaching pre-formed films or films formed in situ, e.g. of plastic, to the metal.

What we claim is:

The method of improving the coating of aluminium alloys consisting of .7 to 2.25% magnesium and up to 1.2% manganese and balance aluminium, comprising rolling, bonding an aluminium clad of at least 99% aluminium with balance miscellaneous impurities of approximately 5% of the thickness of the composite, degreasing the composite with a solvent, coating the composite with a lacquer selected from the group of epoxy lacquer or vinyl lacquer and curing the lacquer by heating to above 250° C. for at least 45 seconds.

(References on following page)

References Cited by the Examiner

UNITED STATES PATENTS

| | | | |
|---|---|---|---|
| 1,911,078 | 5/1933 | Keller | 75—47 |
| 1,932,837 | 10/1933 | Wood | 75—47 |
| 2,100,411 | 11/1937 | Reuleaux | 29—197.5 |
| 2,156,987 | 5/1939 | Hill | 117—132 |
| 2,171,545 | 9/1939 | Edwards | 148—6.27 X |
| 2,188,707 | 1/1940 | Crocker | 117—132 |
| 2,566,513 | 9/1951 | Bishcoff | 117—132 X |
| 2,588,421 | 3/1952 | Shepard | 29—195 X |
| 2,594,820 | 4/1952 | Stern. | |
| 2,699,407 | 1/1955 | Martens | 117—132 |
| 2,726,436 | 12/1955 | Champion | 29—197.5 |
| 2,752,265 | 6/1956 | Whitfield | 29—196.2 X |
| 2,989,492 | 6/1961 | Sanderson | 117—132 X |
| 3,048,105 | 8/1962 | Schlatter. | |

OTHER REFERENCES

Handbook of Engineering Materials, by Miner & Seastone, pages 2–204, 1st edition published 1955 by John Wiley & Sons.

Metals Handbook, 1948 edition, published by A.S.M., page 811.

DAVID L. RECK, *Primary Examiner.*

HYLAND BIZOT, *Examiner.*